United States Patent [19]
Matsuura et al.

[11] Patent Number: 5,460,234
[45] Date of Patent: Oct. 24, 1995

[54] MOTOR VEHICLE

[75] Inventors: Masaaki Matsuura, Tokyo; Kunihiko Tanaka, Saitama; Hiromi Furuhashi, Saitama; Yoshinori Kawashima, Saitama, all of Japan

[73] Assignee: Honda Giken Kogyo Kabushiki Kaisha, Tokyo, Japan

[21] Appl. No.: 26,008

[22] Filed: Mar. 4, 1993

[30] Foreign Application Priority Data

Mar. 4, 1992 [JP] Japan .................... 4-047119

[51] Int. Cl.$^6$ .................... B60K 1/04
[52] U.S. Cl. .................... 180/65.1; 180/68.5; 180/216
[58] Field of Search .................... 180/65.1, 65.6, 180/65.7, 65.8, 215, 216, 217, 295; 248/592, 610

[56] References Cited

U.S. PATENT DOCUMENTS

| | | | |
|---|---|---|---|
| 3,179,199 | 4/1965 | Moran | 180/65.1 |
| 3,330,371 | 7/1967 | Seaman | 180/217 X |
| 3,504,934 | 4/1970 | Wallis | 180/217 X |
| 3,713,502 | 1/1973 | Delaney et al. | 180/217 X |
| 4,135,593 | 1/1979 | Fowkes | 180/65.1 |
| 4,183,418 | 1/1980 | Dudas | 180/216 |
| 4,267,895 | 5/1981 | Eggert, Jr. | 180/65.1 |
| 4,538,697 | 9/1985 | Muroi et al. | 180/68.5 X |
| 4,541,501 | 9/1985 | Kawasaki | 180/217 X |
| 4,667,764 | 5/1987 | Sawada et al. | 180/300 X |

FOREIGN PATENT DOCUMENTS

| | | |
|---|---|---|
| 0052291 | 5/1982 | European Pat. Off. . |
| 0473544 | 8/1991 | European Pat. Off. . |
| 2323544 | 4/1977 | France . |
| 2456029 | 5/1980 | France . |
| 2510709 | 9/1976 | Germany . |
| 2849627 | 5/1980 | Germany . |
| 3316512 | 11/1984 | Germany . |
| 51-20103 | 6/1976 | Japan . |
| 57-42774 | 9/1982 | Japan . |
| 60-89063 | 5/1985 | Japan . |
| 2027978 | 2/1980 | United Kingdom . |
| 2245236 | 1/1992 | United Kingdom . |

OTHER PUBLICATIONS

Design Engineering, Sep. 1990, London GB, pp. 25–26, XP000142537, "Aluminium–Air Batteries Increase the Range of Electric Vehicles".

Revue Technique Automobile, vol. 47, No. 544, Oct. 1992, Boulogne–Billancourt FR, pp. 38–51, XP000310205, "Deux Turbos Chez Peugeot".

Primary Examiner—Richard M. Camby
Assistant Examiner—Michael Mar
Attorney, Agent, or Firm—Birch, Stewart, Kolasch & Birch

[57] ABSTRACT

A motor vehicle adapted to be powered by a drive source driven by batteries which includes at least one battery. A control unit includes an electronic controller, a motor driver for a drive source, and a shift motor. The at least one battery and the control unit are integrally formed and disposed in proximity to a drive source.

6 Claims, 16 Drawing Sheets

MOTOR VEHICLE

BACKGROUND OF THE INVENTION

1. Field of the Invention

The present invention relates to a motor vehicle adapted to be powered by using a motor which is driven by batteries.

2. Description of Background Art

Heretofore, an internal combustion engine has generally been used as a drive source for a vehicle. Vehicles have been proposed wherein the drive source is an electric motor which is driven by chargeable batteries, e.g. lead storage batteries, instead of an internal combustion engine. The use of an electric motor as a drive source for the vehicle is advantageous in that noise and exhaust gas are not generated and it is possible to obtain a vehicle suitable for solving environmental problems.

In an electric powered motor vehicle, it is necessary to provide batteries as an energy source for driving the motor and a control unit is mounted on the vehicle body frame. The construction wherein the batteries and the control unit are mounted on a vehicle body frame in the vicinity of the motor is well known from Japanese Patent Publication No. 20103/76 and Japanese Utility Model Publication No. 42774/82.

If the batteries and the control unit are mounted to the vehicle body frame near the motor as mentioned above, the structure for supporting the batteries and control unit not only becomes complicated but also these members may be influenced by the heat of the motor. In the above conventional motor vehicle, moreover, since the batteries are heavy objects and are supported in front of a driving wheel by the vehicle body frame, a deflected load may be imposed on the vehicle body frame and hence it becomes necessary to reinforce the vehicle body frame, resulting in a tendency to increase the vehicle weight.

SUMMARY AND OBJECTS OF THE INVENTION

The present invention overcomes the above-mentioned deficiencies. It is the object of the invention to provide a motor vehicle in which, by a rational layout of the batteries, the structure for supporting the batteries is simplified and a reduction in weight of the vehicle body is attained.

For achieving the aforementioned object, the present invention includes a motor vehicle using as a drive source a motor which is driven by batteries, the batteries and the control unit are disposed in an integral form near the motor.

According to a second feature of the present invention, in addition to the first feature, the batteries and the control unit are supported by a vehicle body frame in a vibration-proof manner.

According to a third feature of the present invention, in addition to the first feature, the batteries are also accommodated within the interior of a battery box, and the control unit is disposed within a constituent member of the battery box.

According to a fourth feature of the present invention, in addition to the first feature, the control unit also includes at least a charger for the batteries.

According to a fifth feature of the present invention, in addition to the first feature, batteries accommodated in a battery receptacle portion and a control unit accommodated in a control unit receptacle portion which is disposed in close proximity to the battery receptacle portion, are connected with each other through a cord, and the cord includes a connecting means so as to permit access to the control unit receptacle portion upon removal of the cord from the batteries.

According to a sixth feature of the present invention, in addition to the first feature, a cooling fan is disposed in the interior of a battery receptacle portion containing the batteries.

According to a seventh feature of the present invention, in addition to the first feature, a cooling fan is disposed in the interior of a control unit receptacle portion containing the control unit.

According to an eighth feature of the present invention, in a motor vehicle adapted to run using as a power source a motor which is driven by batteries, a wheel is suspended through a cushion from a vehicle body frame which supports the batteries, and the batteries are distributed before and behind the cushion.

According to a ninth feature of the present invention, in addition to the eighth feature, the batteries are arranged in front of and above the motor in such a manner that the battery located in front of the motor is in a lower position than the battery located above the motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE INVENTION

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
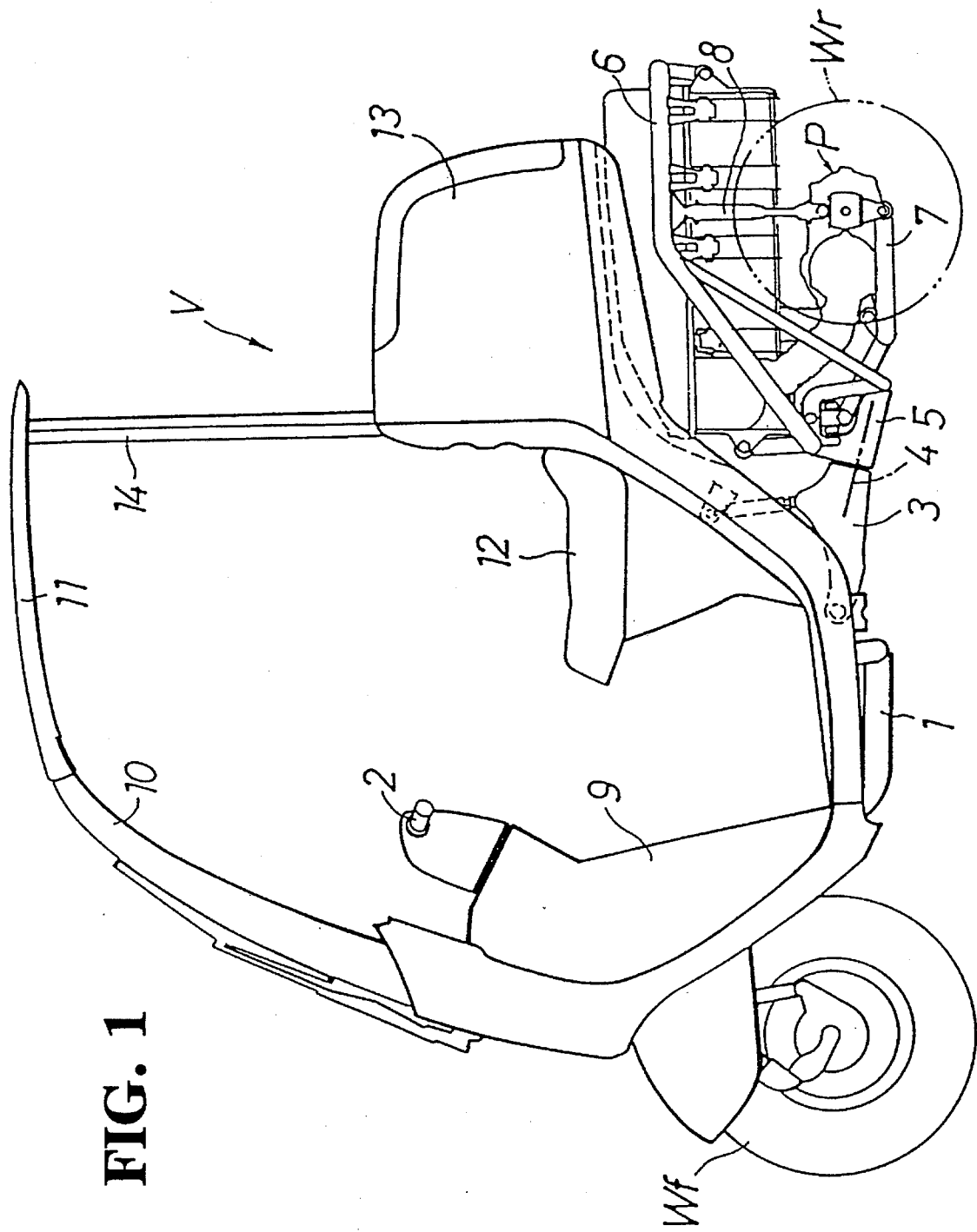
FIG. 1 is a side elevational view of a three-wheeled motor vehicle according to a first embodiment of the present invention.

As shown in FIG. 1, a three-wheeled motor vehicle V embodying the invention is provided with a front body frame 1 constructed by welding steel pipes. On the front side of the frame 1 is supported a front wheel Wf which is steered by a handle 2. A front body bracket 3 is provided at the rear portion of the front body frame 1, and a rear body bracket 5 is supported by the front body bracket 3 so as to be swingable right and left through a swing shaft 4 which is disposed in a slightly forwardly raised state in the longitudinal direction of the vehicle body. To the rear body bracket 5 is fixed the front end of a first rear body frame 6 constructed of a steel pipe, and a second rear body frame 7 constructed of a steel pipe is supported vertically swingable by the frame 6. Further, a power unit P having a pair of right and left rear wheels Wr is mounted on the frame 7. The first and second rear body frames 6, 7 are connected together through a pair of right and left rear cushions 8. Therefore, when the vehicle V turns, the front body frame 1 can be allowed to swing transversely relative to the frames 6 and 7, while the frame 7 can be allowed to swing vertically relative to the frame 6.

The front body frame 1 is covered with a synthetic resin body 9. A windshield 10 is connected to the front portion of the body 9. A roof 11 for shielding the driver from wind, rain and sunshine is also provided. The rear end of the roof 11 is supported by the upper end of a support rod 14 mounted upright between a seat 12 and a trunk 13.

Figure 2:
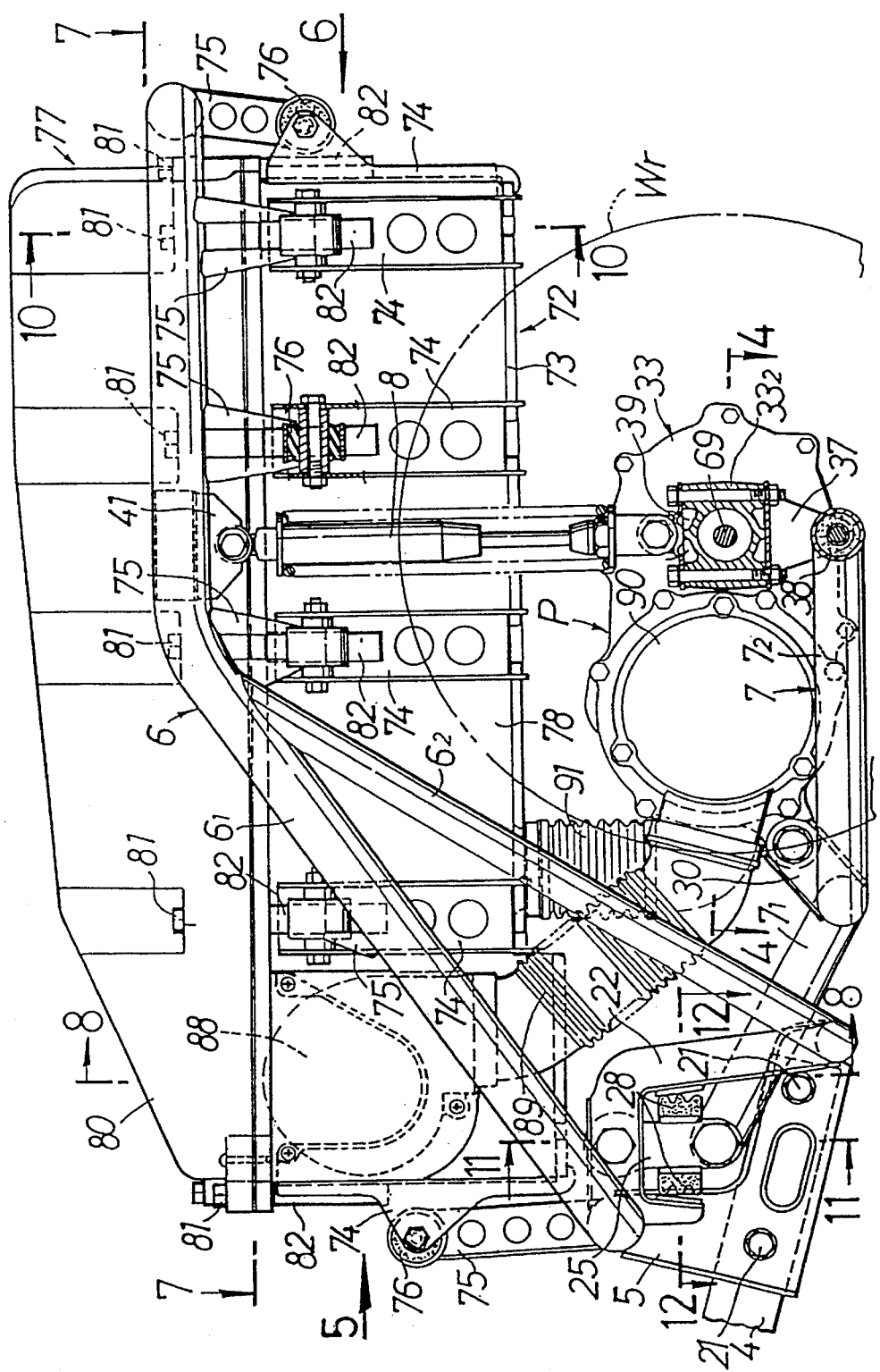
FIG. 2 is a side view of a rear portion of the vehicle body.
Figure 5:
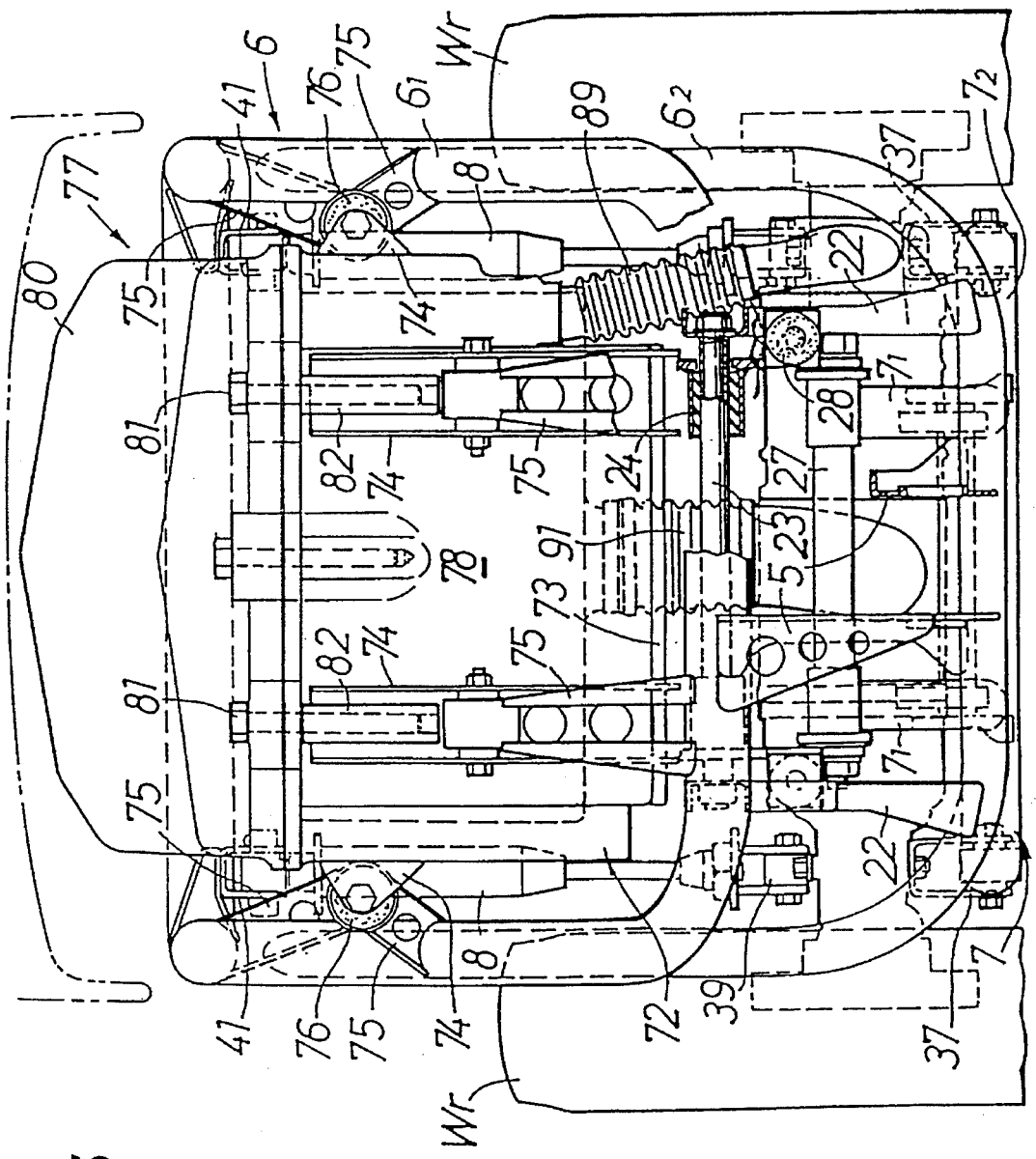
FIG. 5 is a view as seen in the direction of arrow 5 in FIG. 2.
Figure 6:
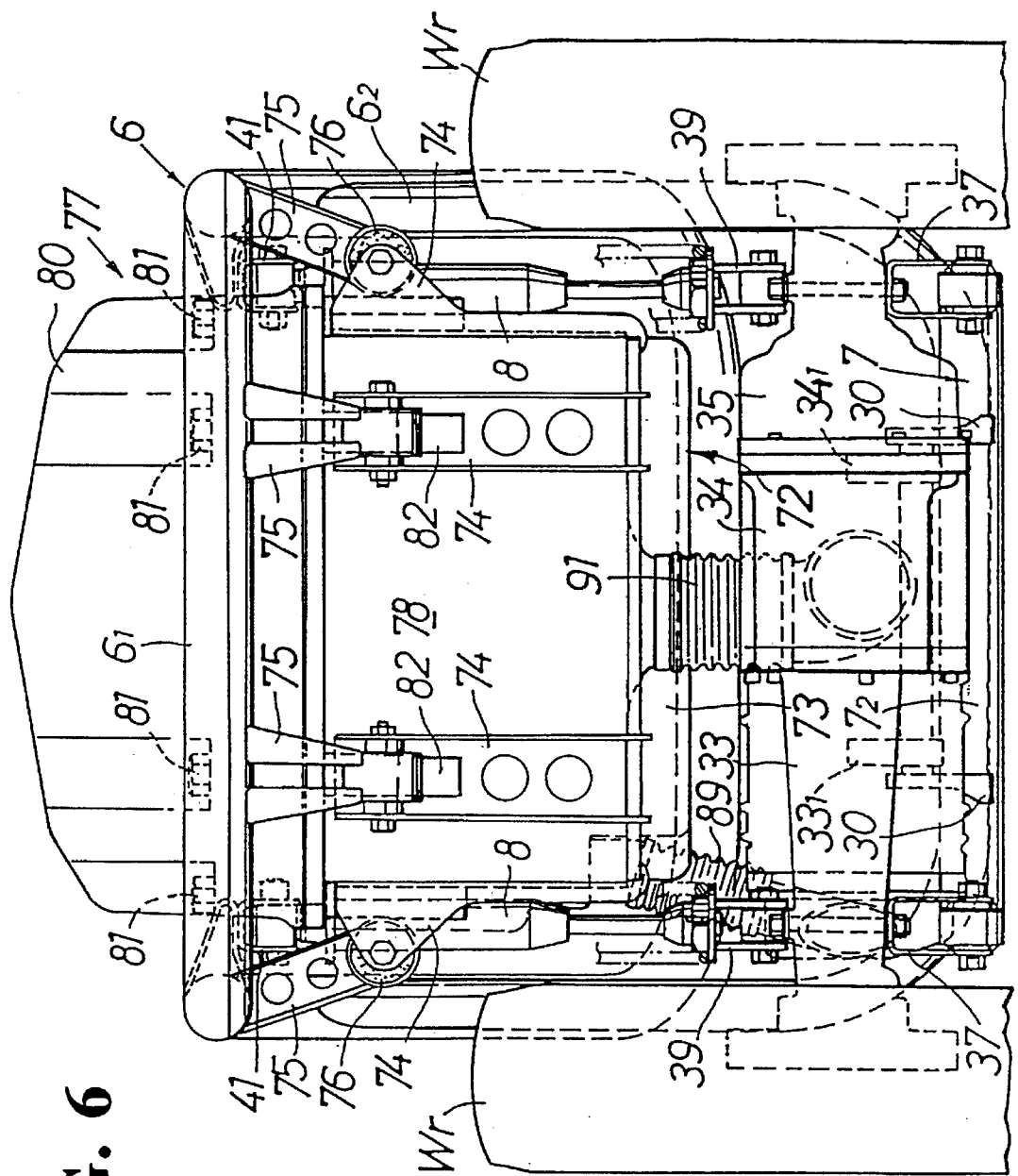
FIG. 6 is a view as seen in the direction of arrow 6 in FIG. 2.
Figure 7:
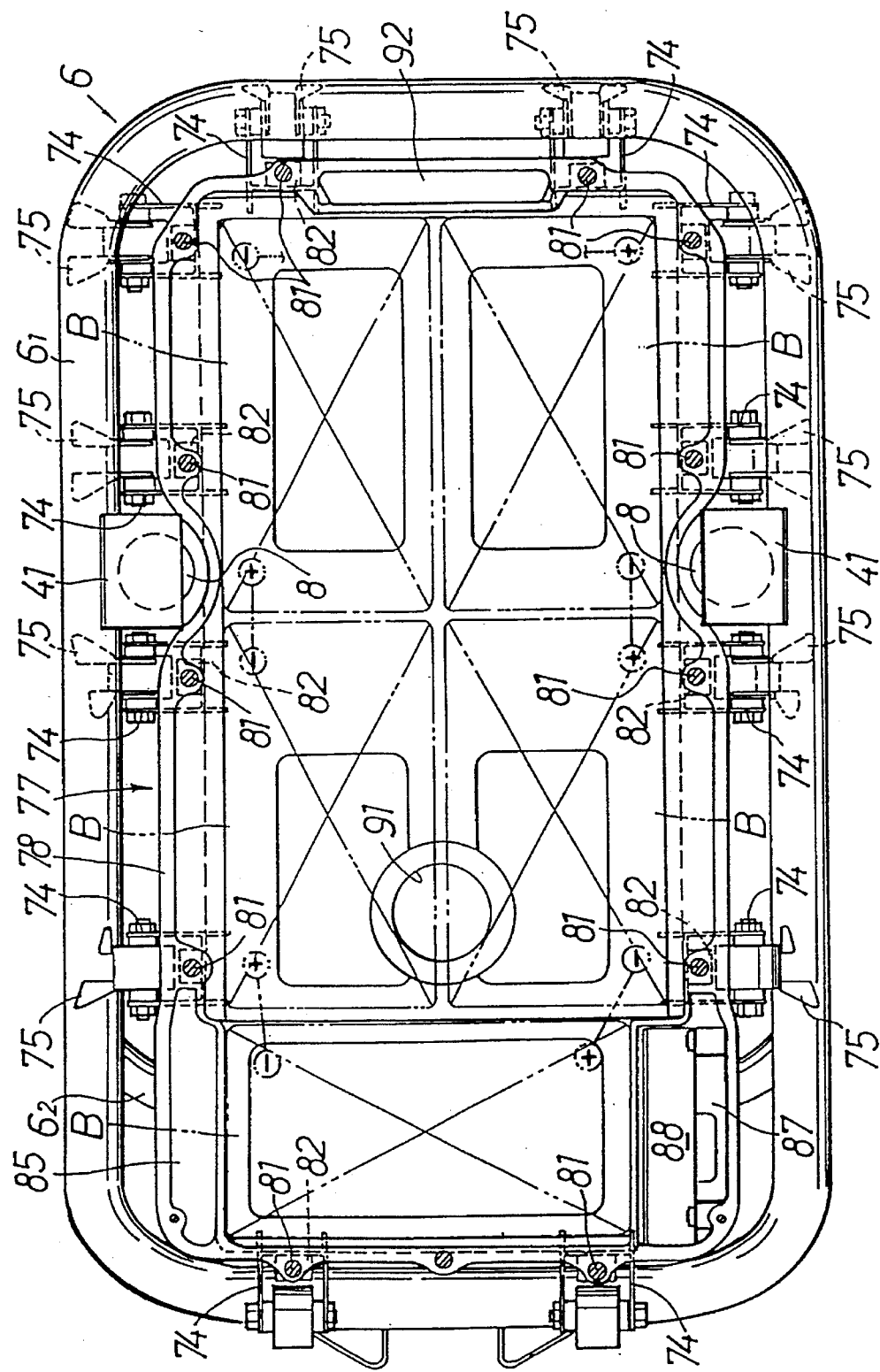
FIG. 7 is a sectional view taken along line 7—7 in FIG. 2.
Figure 8:
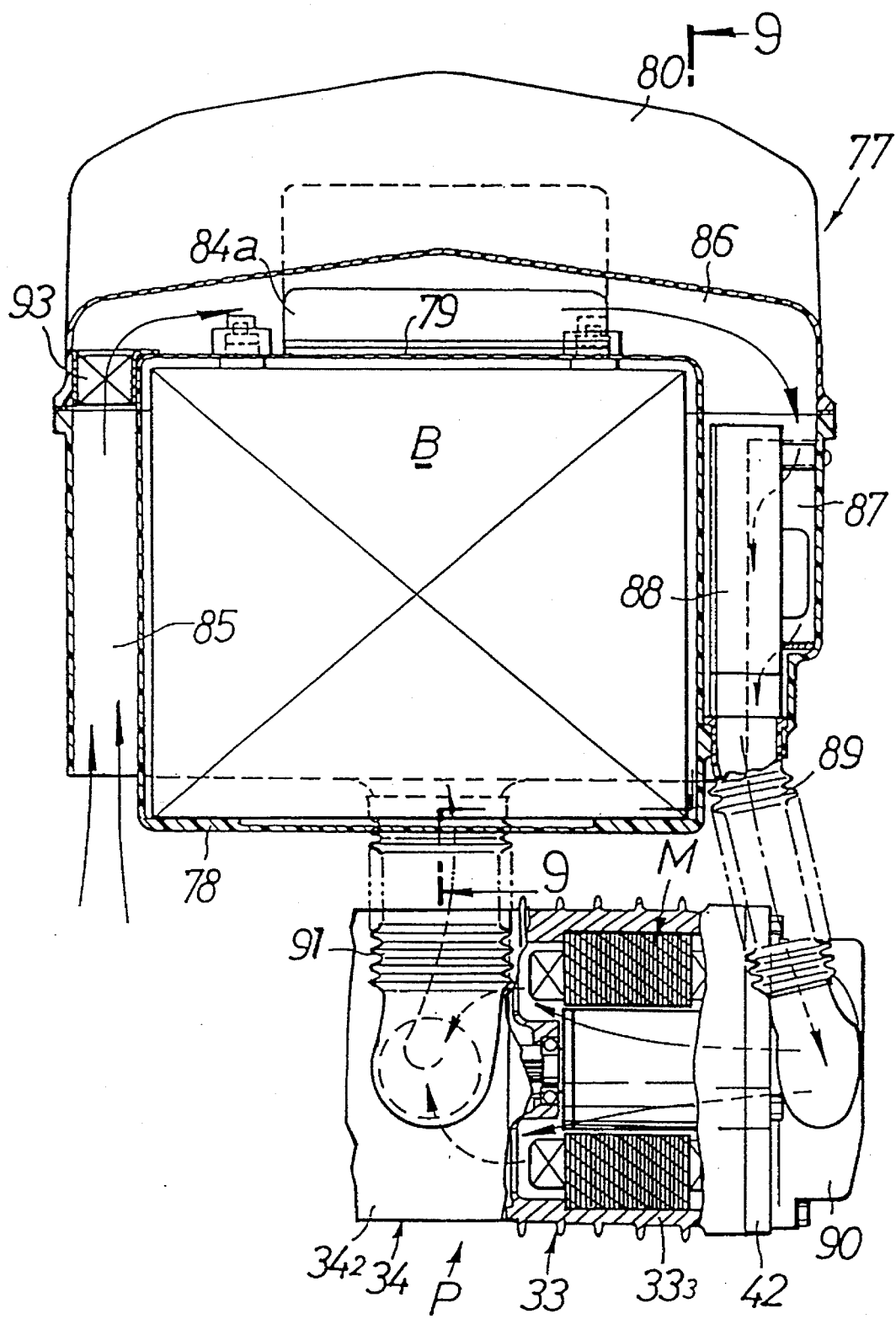
FIG. 8 is a sectional view taken on line 8—8 of FIG. 2.

As is apparent from FIGS. 1, 2 and 5, the first rear body frame 6 is provided with a frame member $6_1$, see FIG. 7, which is elliptic when viewed in a plan view, and is also provided with a U-shaped frame member $6_2$ connected to the underside of the front portion of the frame member $6_1$. The rear body bracket 5 is provided to the right and left in a pair, and the front portion of the frame member $6_1$ and that of the frame member 62 are connected by the brackets 5. The swing shaft 4 which extends backward from the front body bracket 3 provided at the rear portion of the front body frame 1 is disposed between the paired brackets 5 and fixed to the brackets with front and rear bolts 21, whereby the front body bracket 3 which supports the front body frame 1 is supported in a transversely swingable manner relative to the rear body brackets 5 which support the first and second rear body frames 6, 7.

Figure 11:
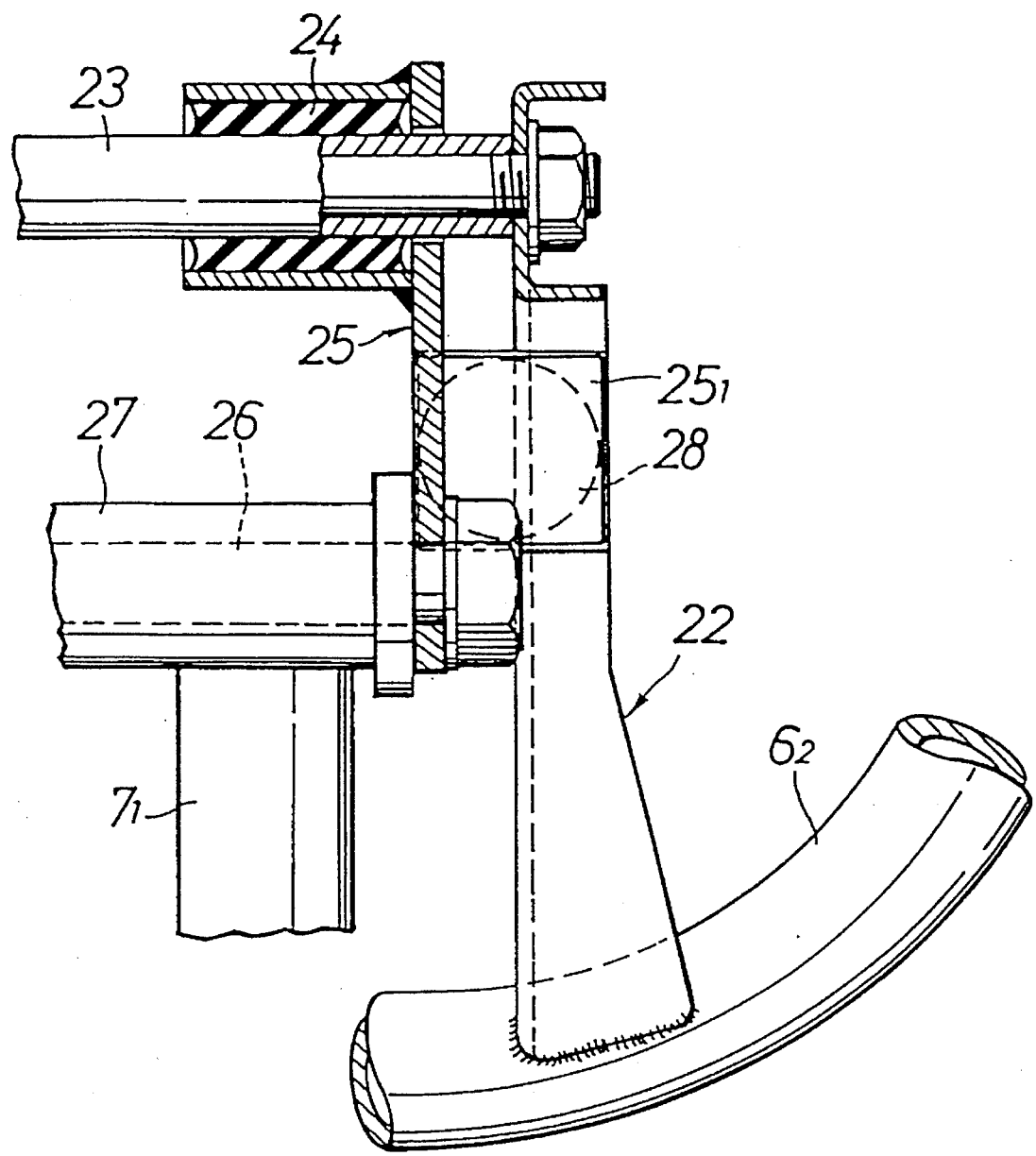
FIG. 11 is a partial sectional view taken on line 11—11 in FIG. 2.
Figure 12:
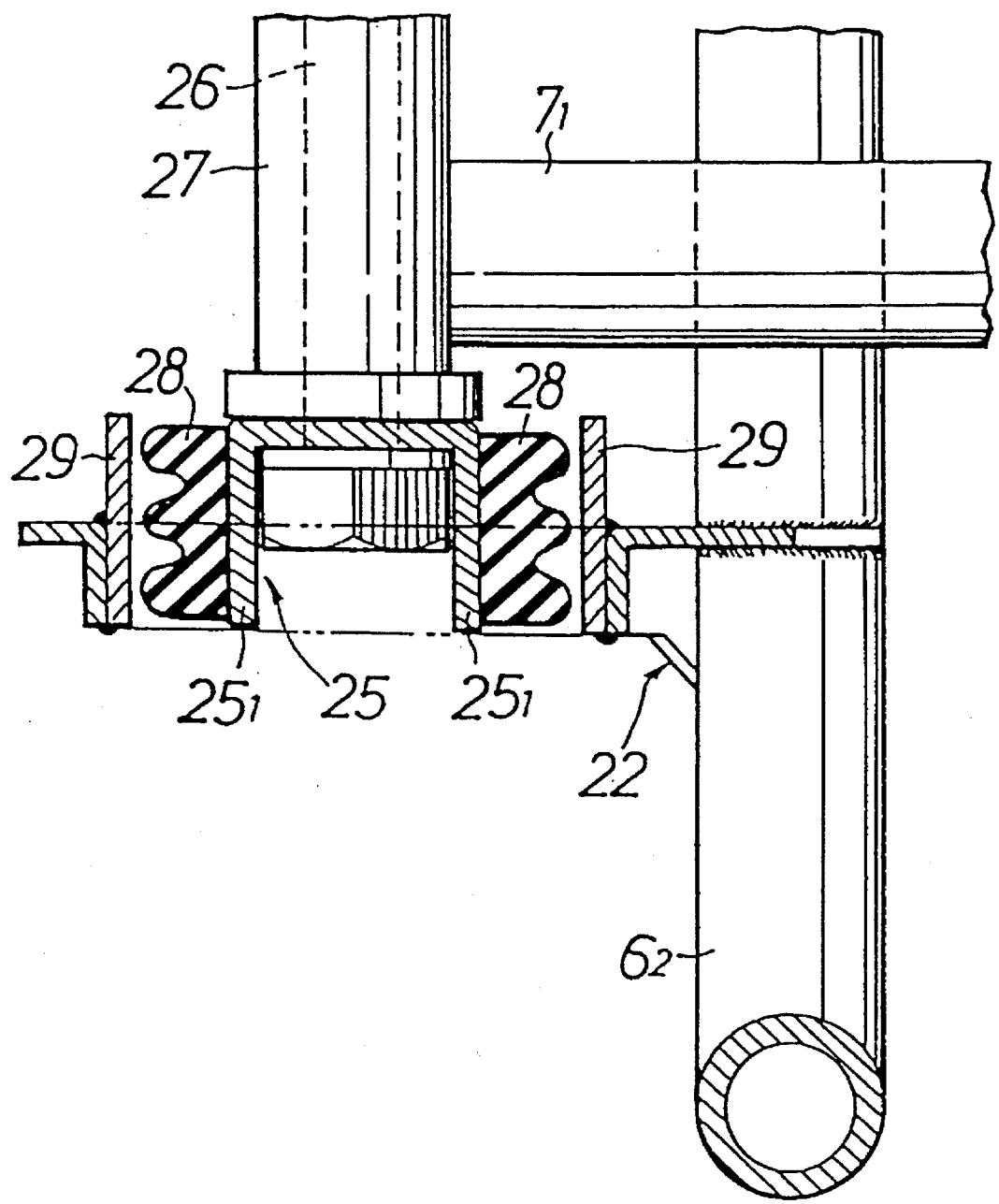
FIG. 12 is a partial sectional view taken on line 12—12 in FIG. 2.
Figure 13:
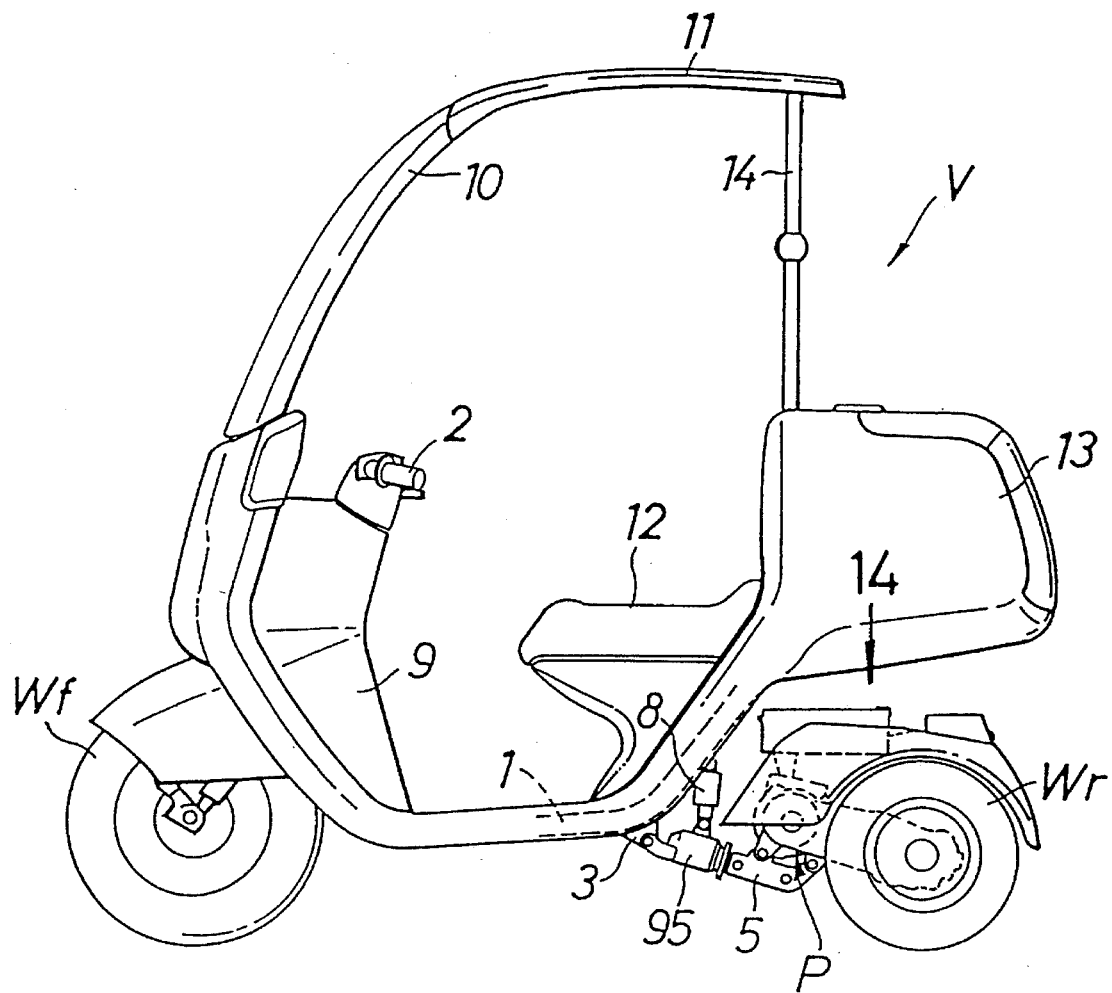
FIG. 13 is a side view of a three-wheeled motor vehicle according to a second embodiment of the present invention.
Figure 14:
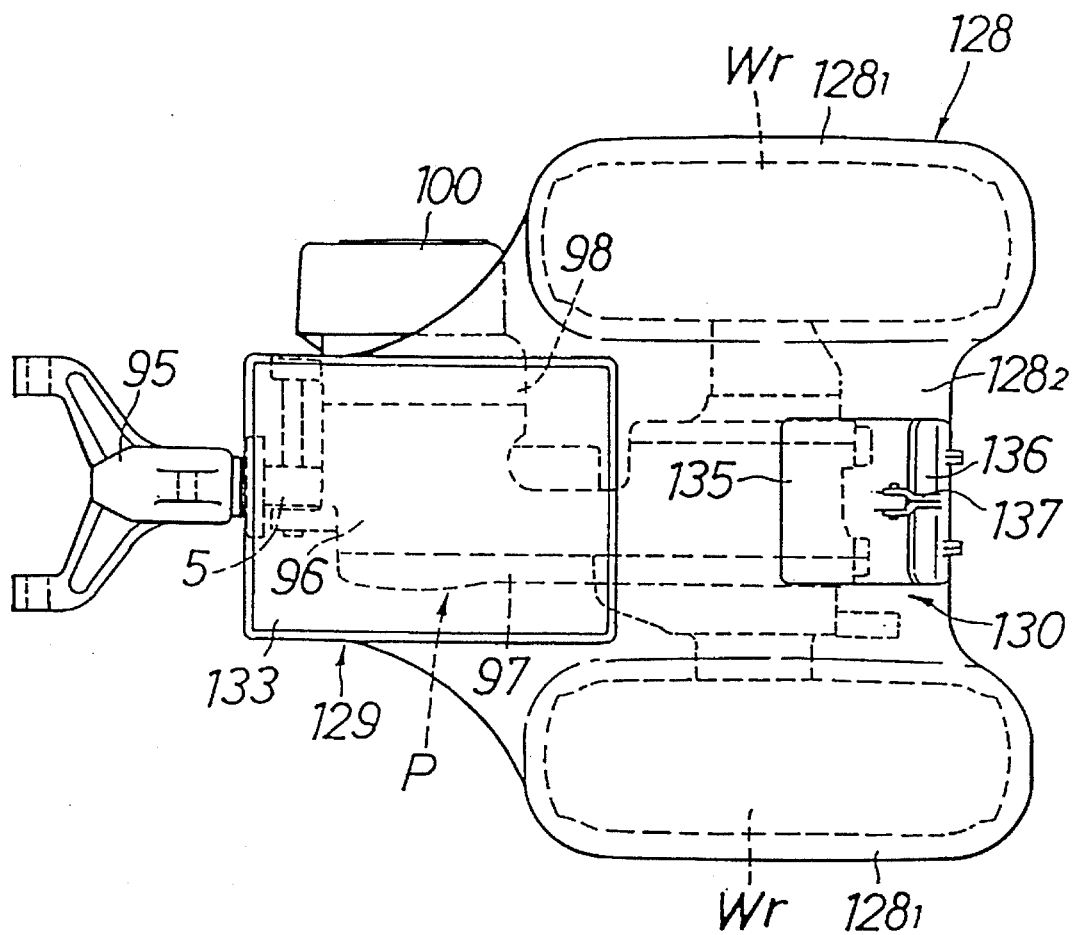
FIG. 14 is a view as seen in the direction of arrow 14 in FIG. 13.
Figure 15:
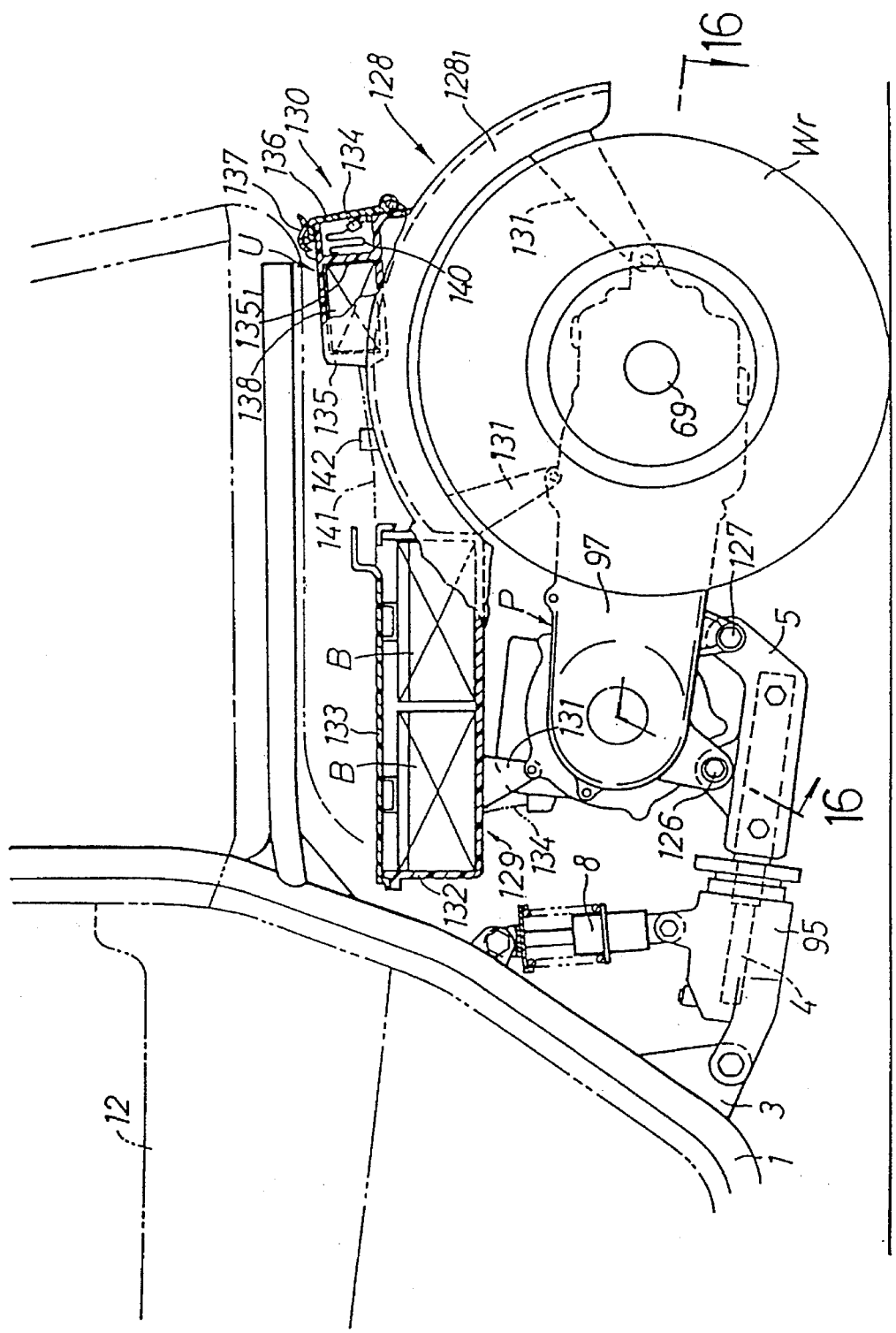
FIG. 15 is an enlarged view of a principal portion of FIG. 13.
Figure 16:
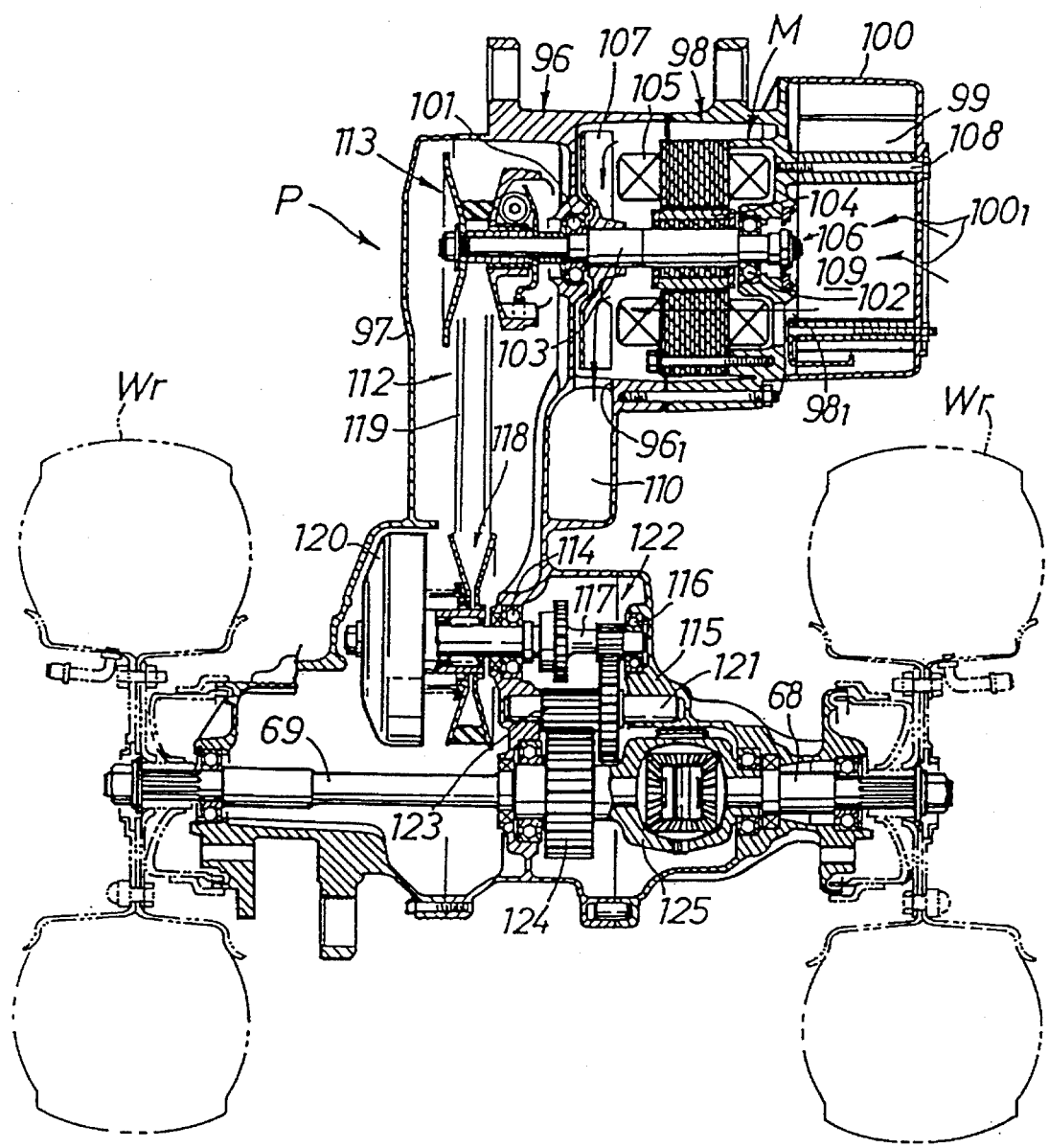
FIG. 16 is a sectional view taken along line 16—16 FIG. 15.

As will be seen by reference to both FIGS. 11 and 12, the frame members $6_1$ and $6_2$ are interconnected through a pair of brackets 22 which are each in an inverted L shape when seen in a side view, in right and left positions outside the rear body brackets 5. The upper ends of the paired brackets 22 are connected together through a transversely extending support shaft 23, and a pair of right and left arms 25 are supported in a longitudinally swingable manner by the support shaft 23 each through a rubber damper 24. Further, a support shaft 26 is disposed bridgewise between the lower ends of the right and left arms 25, with a pipe member 27 being rotatably fitted over the outer periphery of the support shaft 26. Fixed to the pipe member 27 is the second rear body frame 7 extending rearwardly of the vehicle body. The frame 7 is composed of a pair of right and left frame members $7_1$ fixed to the pipe member 27 and a frame member $7_2$ which is fixed to the rear ends of the frame members $7_1$ and which is U-shaped when viewed in a plan view.

A rubber damper support portion $25_1$ projects from each arm 25 toward the outside of the vehicle body, and a pair of front and rear rubber dampers 28 are fixed to the rubber damper support portion $25_1$. Further, a pair of front and rear abutment places 29 are fixed to the brackets 22 so as to be opposed in front and in the rear to the rubber dampers 28 through a predetermined gap.

As shown in FIGS. 3 to 6, a pair of right and left brackets 30 are fixed to the front portion of the frame member $7_2$ and are interconnected through a transversely extending support shaft 31. A pair of left and right brackets $33_1$, $34_1$ project in a front lower position of the power unit P, and are each supported by the support shaft 31 through a rubber damper 32. On the other hand, the left and right rear end portions of the frame member $7_2$ are each connected through a rubber damper 38 to a U-shaped bracket 37 which is fixed with bolts 36 to the undersides of a left axle case $33_2$ and a right axle case $35_1$. Brackets 39 are also fixed with bolts 36 to the upper surfaces of both axle cases $33_2$ and $35_1$, and the lower ends of the rear cushions 8 are each connected to the brackets 39 through a rubber damper 40, while the upper ends of the rear cushions 8 are connected to brackets 41 mounted to the frame member $6_1$.

Figure 3:
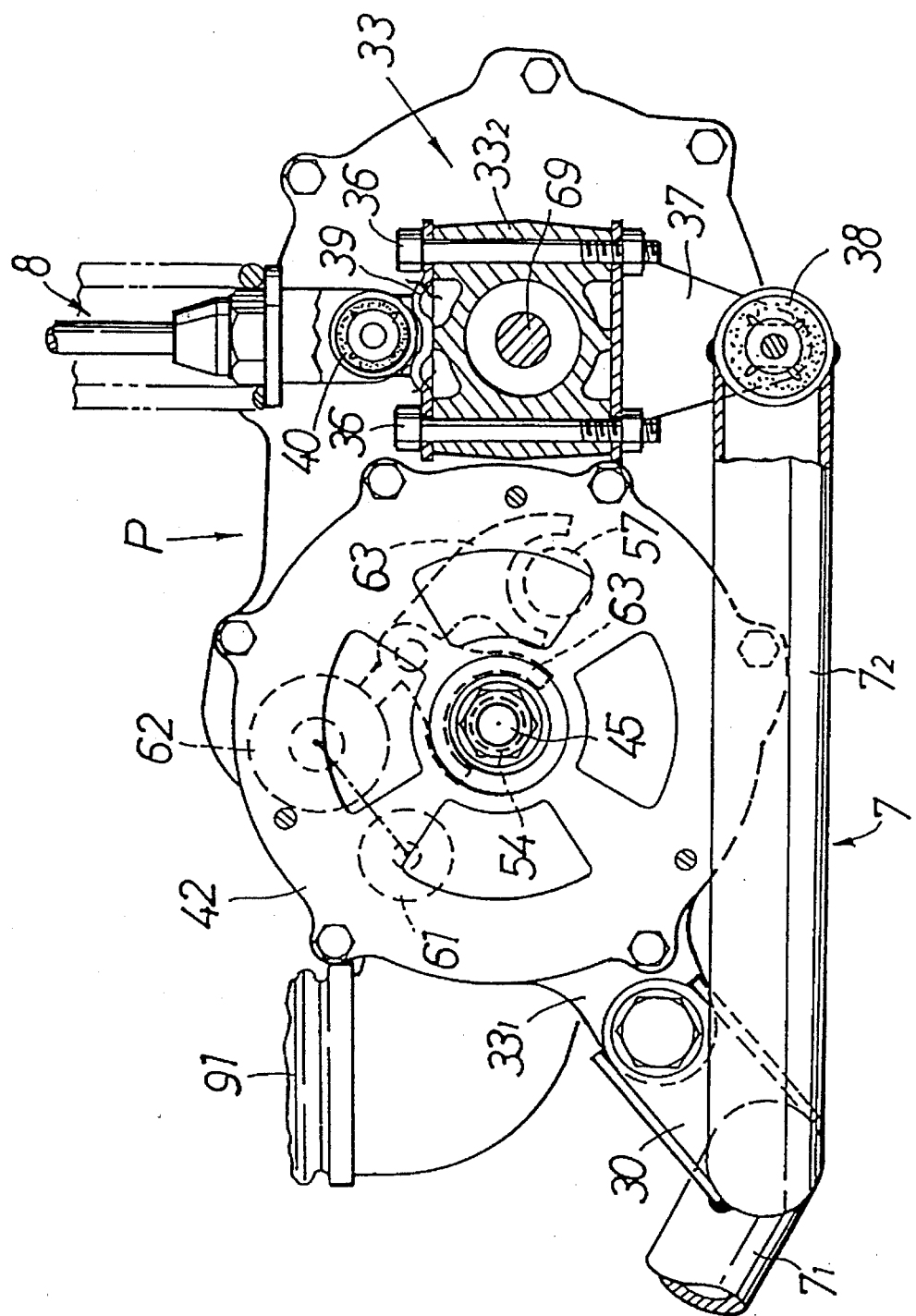
FIG. 3 is an enlarged view of a principal portion of FIG. 2.

The structure of the power unit P will now be described with reference to FIGS. 3 and 4. The power unit P has a left-hand casing 33, a center casing 34 and a right-hand casing 35, which are formed by trisection along two vertical dividing planes extending in the longitudinal direction of the vehicle body. The three casings 33, 34 and 35 are combined to constitute a single block. The left-hand casing 33 is integrally provided with a power motor case $33_3$ between the bracket $33_1$ and the left axle case $33_2$. The center casing 34 is provided at the rear portion of the bracket $34_1$ with a left transmission case $34_2$ which covers the left half of a transmission T, while the right-hand casing 35 is provided at the rear portion of the right axle case $35_1$ with a right transmission case $35_2$ which covers the right half of the transmission T.

A power motor M is disposed in the interior of the power motor case $33_3$ of the left-hand casing 33. The power motor M is a direct current brushless motor and is provided with a rotatable shaft 45. The rotatable shaft 45 is carried on both a ball bearing 43 provided in a cover 42 which covers a left-end opening of the power motor case $33_3$ and a ball bearing 44 provided in the right-hand wall of the power motor case $33_3$. On the rotatable shaft 45 is mounted a rotor 48 which comprises an iron core 46 and a permanent magnet 47 disposed on the outer periphery of the iron core. Further, around the rotor 48 is supported a stator 51 which comprises an iron core 49 and a coil 50 wound round the iron core.

A main shaft 54 carried on a pair of ball bearings 52 and 53, a counter shaft 57 carried on a pair of ball bearings 55 and 56, and a differential case 60 carried on a pair of ball bearings 58 and 59, are disposed in parallel between the left transmission case $34_2$ of the center casing 34 and the right transmission case $35_2$ of the right-hand casing 35. Further, plural gear trains of the transmission T are supported by the main shaft 54 and the counter shaft 57. A shift fork 63 supported by a shift drum 62 which is rotated by a shift motor 61 comes into engagement with the gear train selectively, whereby a desired gear for speed change is established in the transmission T, see FIG. 3.

The rotatable shaft 45 of the power motor M and the main shaft 54 are disposed coaxially and their opposed ends are coupled together through a rubber coupling 64. A final driven gear 66 is provided at the rightmost end of the differential case 60 and it is in mesh with a final drive gear 65 on the counter shaft 57. The final driven gear 66 is provided with a damper 67 for absorbing shock at the time of gear shift. The driving force of the power motor M is transmitted from the main shaft 54 to the differential case 60 through the counter shaft 57 and is further transmitted to left and right axles 68, 69.

Figure 4:
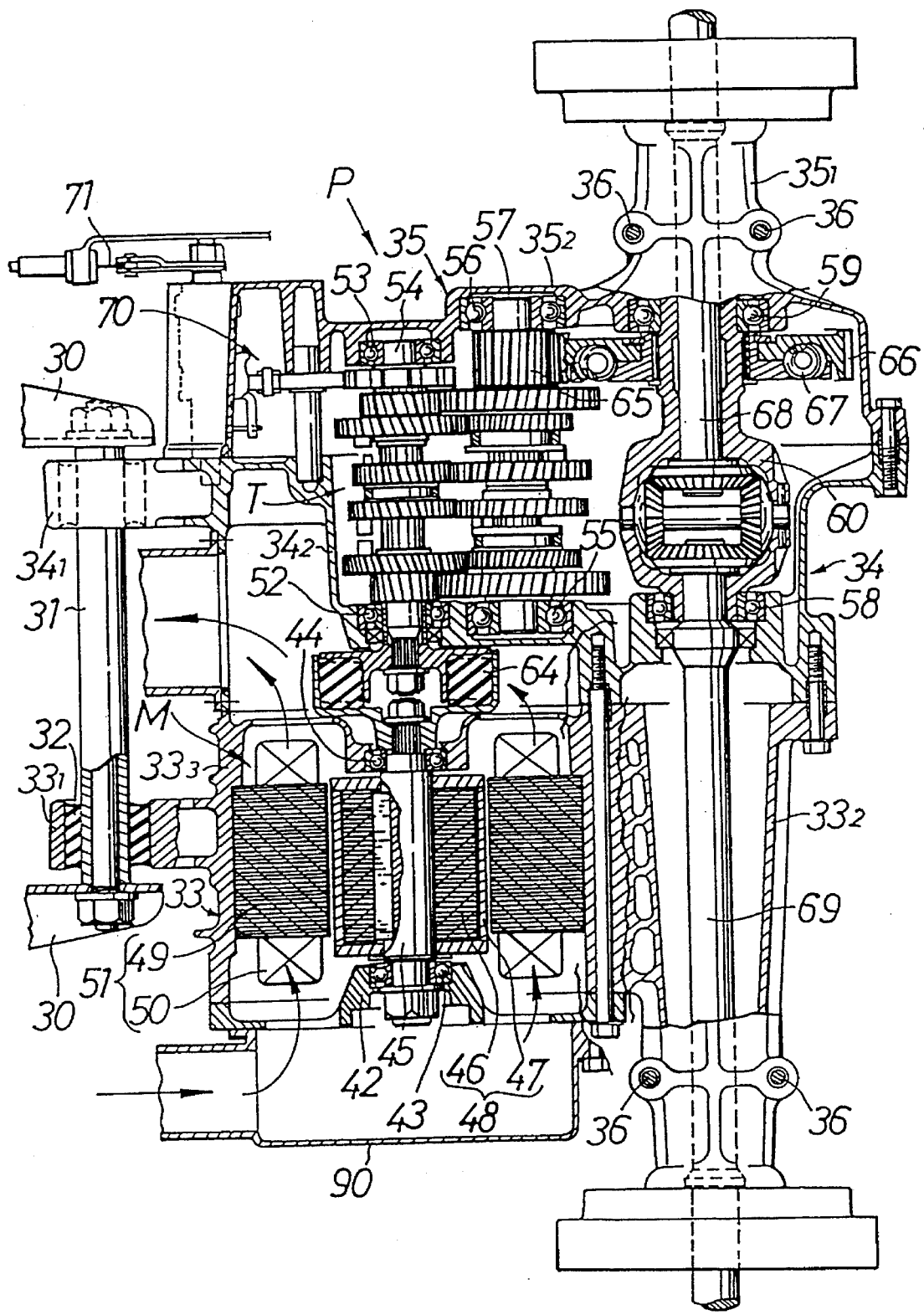
FIG. 4 is a sectional view taken along line 4—4 in FIG. 2.

As illustrated in FIG. 4, a parking brake mechanism 70 is provided for locking the main shaft 54 by operation of a Bowden wire 71.

The support structure for the batteries B which serve as an energy source for the vehicle is hereinafter described with reference to FIGS. 2, 5–7 and 10.

A battery support frame 72 includes a bottom plate 73 having a front end which is lower than the other portion of the bottom plate and a plurality of hanger members 74 which are erected upwardly on the outer periphery of the bottom plate 73. The hanger members 74, which are a sideways "U" shape in section, are disposed four to the right and left side positions of the battery support frame 72 and two in front and rear positions thereof. On the other hand, eight brackets 75 welded to the frame member $6_1$ of the first rear body frame 6, and the hanger members 74 are supported by the brackets 75 each through a rubber damper 76. By this construction, the battery support frame 72 is suspended elastically in a fitted state in the interior of the frame member $6_1$, whereby shock from the road surface is prevented from being transmitted directly to the batteries B.

Figure 10:
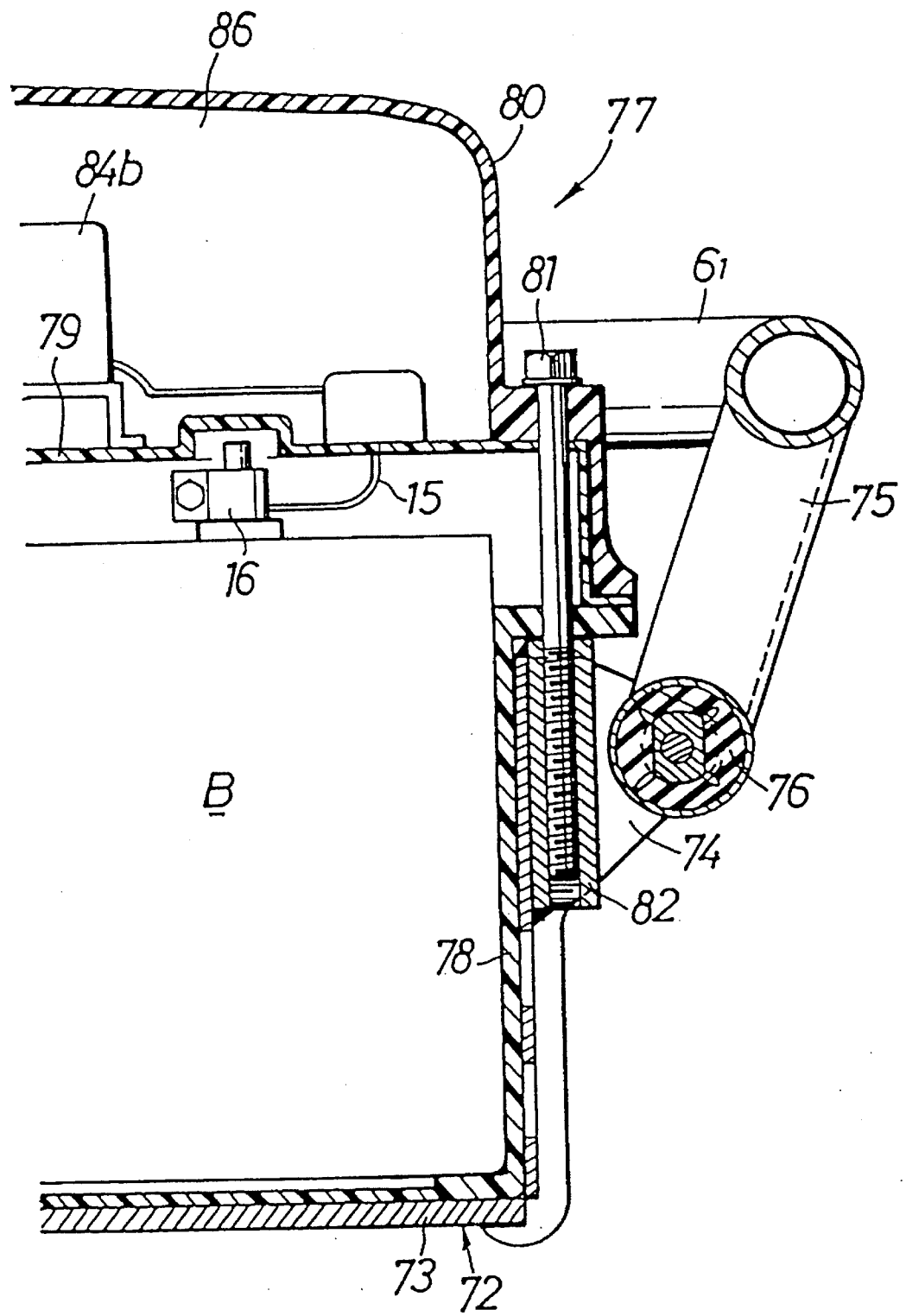
FIG. 10 is a partial sectional view taken on line 10—10 in FIG. 2.

A battery box 77 is fitted and held inside the battery support frame 72. The battery box 77 is composed of a battery box body 78 for receiving therein the batteries B which serve as an energy source for the vehicle, and a battery box cover 80 which covers the upper portion of the battery box body 78 through a partition plate 79. As best shown in FIG. 10, the peripheral edges of the battery box body 78, partition plate 79 and battery box cover 80 are overlapped with one another, and bolts 81 extend from above through the overlapped portion and are threaded into nut members 82 which are welded to the hanger members 74, whereby the battery box body 78 is fixed to the battery support frame 72 and the battery box cover 80 is fixed to the battery box body 78.

Figure 9:
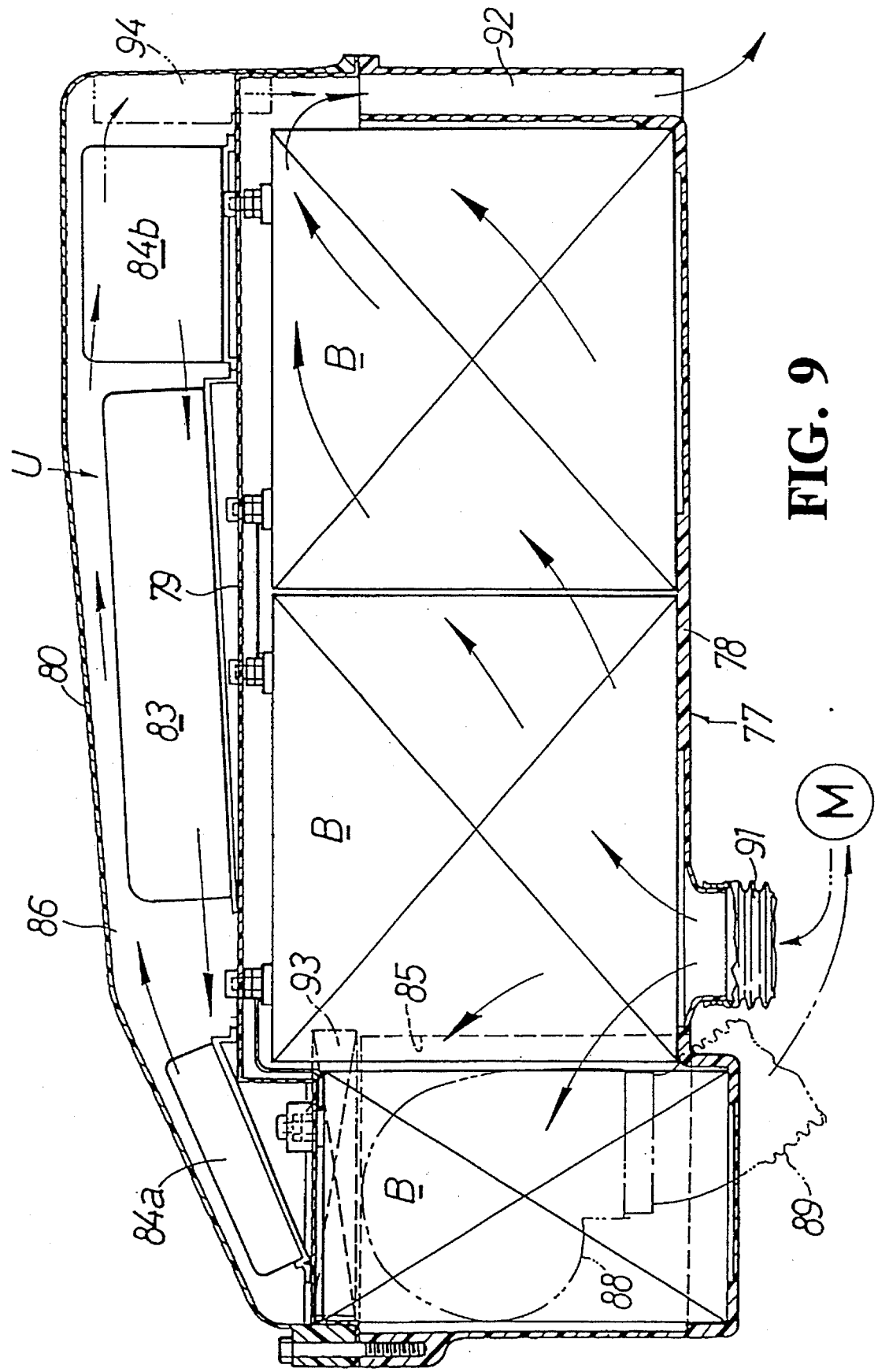
FIG. 9 is a sectional view taken on line 9—9 in FIG. 8.

One battery B is accommodated sideways in the front portion of the battery box body 78. In the portion of the battery box body behind the battery B, there are accommodated four additional batteries B each longitudinally arranged as illustrated in FIGS. 7 and 9. In the interior of the battery box cover 80 which is partitioned from the battery box body 78 through the partition plate 79, there is disposed a control unit U which includes an electronic controller 83, a motor driver 84a for the power motor M and the shift motor 61 and a charger 84b.

As is apparent from FIG. 2, some of the plurality of batteries B held in the battery box 77 are disposed in front of the rear cushions 8 through which the rear wheels Wr are suspended from the first rear body frame 6, while the other batteries are disposed behind the rear cushions 8. Thus, by dispersing the load of the batteries B in front and in the rear of the first rear body frame 6 with the rear cushions 8 as the center, the battery load can be transferred to the rear cushions 8 without being concentrated on a specific part of the frame 6. As a result, it is no longer necessary to specially reinforce the first rear body frame 6, and hence, it is possible to attain a reduction in the weight of the vehicle.

As is apparent from FIG. 10, a cord 15 for connecting a terminal of each battery B with the control unit U can be attached to and detached from the battery terminal through a connector 16. The length of the cord 15 is set to a value which permits mounting and removal of the connector 16 in a slightly opened state of the battery box cover 80. Therefore, for opening the cover 80 to effect maintenance of the control unit U, it is necessary to remove the connector 16. That is, the power supply system is cut off automatically at the time of inspection for maintenance and thus the working efficiency for maintenance is improved. Since both the batteries B and the control unit U are accommodated in the interior of the battery box 77, not only is the support structure for the batteries B and the control unit U simplified but also the ventilation near the power motor M is improved to thereby improve the cooling performance for the same motor. Further, since the batteries B are heavy objects which are mounted in a low position on the rear vehicle body portion and the control unit U is disposed above the batteries, it is possible to keep the vehicular centroid position low and thereby improve the stability of the vehicle body. Additionally, singe the weight of the batteries B is not applied to the front portion of the vehicle body which swings right and left during vehicular running, it is possible to let the vehicle exhibit an excellent turning performance.

A warming structure for the batteries B and a cooling structure for the control unit U will be described below with reference to FIGS. 2, 4, 8 and 9.

A first cooling air passage 85 which opens downward is formed in the right-hand side face of the front portion of the battery box body 78, namely, the right side face of the battery B disposed at the front end. The upper end of the first cooling air passage 85 is connected through an air cleaner element 93 to a horizontal, second cooling air passage 86 which is defined by both the battery box cover 80 and the partition plate 79. The second cooling air passage 86 is in communication with the inside of the battery box cover 80 in which is disposed the control unit U, and it is connected to the upper end of a third cooling air passage 87 which is formed in the left-hand side face of the front portion of the battery box body 78. A motor-driven type fan 88 is disposed in the third cooling air passage 87 to introduce the outside air from the lower end of the first cooling air passage 85.

An exhaust port of the fan 88 is connected to an intake chamber 90 formed on the outer surface of the cover 42 of the power motor M through a fourth cooling air passage 89 which is constructed of a flexible duct. The intake chamber 90 is in communication with the interior of the power motor case $33_3$ of the left-hand casing 33 through the opening of the cover 42. Further, the interior of the power motor case $33_3$ is in communication with the front portion of the left transmission case $34_1$ of the center casing, from which it is connected to the bottom of the battery box body 78 through a warm air passage 91 which is constructed of a flexible duct. An exhaust passage 92 which is open downward is formed in the rear portion of the battery box body 78.

The operation of the first embodiment of the present invention having the construction described above will be explained below.

In FIG. 4, the driving force transmitted from the rotatable shaft 45 of the power motor M to the main shaft 54 through the rubber coupling 64 is reduced to a predetermined reduction ratio by means of a gear train which has been set by a gear shift in the transmission T, and then transmitted to the counter shaft 57. Further, the driving force transmitted from the final drive gear 65 mounted on the counter shaft 57 to the differential case 60 through the final driven gear 66 is then transmitted to the left and right axles 68, 69 to drive the left and right rear wheels Wr. When the shift motor 61 operates in accordance with a shift command, the shift drum 62 rotates and the shift fork 67 is thereby driven to set a new gear train in the transmission T, see FIG. 3. The shock at the time of gear shift is absorbed by the operation of the damper 67 provided in the final driven gear 66.

In FIG. 2, when the rear wheels Wr undergo a shock from the road surface while the three-wheeled motor vehicle V is moving, the second rear body frame 7 which supports the power unit P slightly moves longitudinally and swings vertically with respect to the first rear body frame 6 to absorb the shock. More specifically, when a longitudinal load is applied from the power unit P to the second rear body frame 7, the arms 25 which pivotally support the front ends of the frame members $7_1$ swing longitudinally and the rubber dampers 28 provided on the front and rear faces of the arms 25 come into abutment with the abutment members 29 attached to the brackets 22 and are compressed thereby, see FIGS. 11 and 12, whereby the longitudinal load imposed on the power unit P is absorbed. On the other hand, when a vertical load is applied to the power unit P, the second rear body frame 7 which is pivotally supported by the lower ends of the arms 25 through the support shaft 26 and the pipe member 27 swings vertically, see FIGS. 11 and 12. As a result, the rear cushions 8 which connect the left and right axle cases $33_1$, $35_1$ of the power unit P with the first rear body frame 6 expands or contracts to absorb the vertical load.

When a rise in temperature of the power unit P exceeding a predetermined value is detected by means of a sensor, not shown, the fan 88 provided in the third cooling air passage 87 in the battery box 77 is driven, whereby the outside air is introduced into the battery motor case $33_3$ through the first to fourth cooling air passages 85, 86, 87 and 89. The outside air is introduced also into the inside of the battery box cover 80 which is connected to the second cooling air passage 86, to cool the control unit U disposed therein. The air which has cooled the power motor M during passage through the interior of the power motor case $33_3$ and is thereby increased in temperature is fed to the interior of the battery box body 78 through the warm air passage 91 to warm the five batteries B accommodated therein. Thereafter, the air is discharged through the exhaust passage 92 formed in the rear portion of the battery box body 78.

Thus, since the batteries B are warmed by the air whose temperature has increased by cooling the power motor M, it is not necessary to use a special heat source for warming the batteries. By utilizing the fan 88 for the motor cooling air, it is no longer required to use a special fan for warming the batteries. By warming the batteries B to an appropriate temperature to increase the capacity thereof during vehicular movement, it is possible to increase the maximum vehicular running distance for each charging. Moreover, at the time of charging the batteries B which have discharged due to vehicular running, the time required for the charging can be shortened by warming the batteries B while allowing the power motor M to operate under no load. At this time, since the battery box body 78 is partitioned from the outside air by the battery box cover 80 and is thereby heat-insulated, it is possible to easily control the temperature of the batteries B. Further, because the control unit U is cooled by utilizing the cooling air for the power motor M, it is possible to cool the control unit without the need of providing any special cooling means.

FIGS. 13 to 16 illustrate a second embodiment of the present invention. A basic body structure of this three-wheeled motor vehicle, indicated at V, is substantially the same as that of the first embodiment. A swing bracket 95 is vertically swingably supported by a front body bracket 3 mounted to a front body frame 1, and a rear body bracket 5 provided on the rear vehicle body side is supported by the swing bracket 95 in a transversely swingable manner through a swing shaft 4. Further, the swing bracket 95 and the front body frame 1 are connected together through a rear cushion 8. By this construction, the front vehicle body can be allowed to swing right and left with respect to the rear vehicle body, and the rear vehicle body can be allowed to swing up and down while allowing the rear cushion or shock absorber 8 to expand and contract with respect to the front vehicle body.

A power unit P according to the second embodiment which is supported by the rear vehicle body is provided with a transmission case 96 and a side cover 97 which covers a left-hand opening of the transmission case. To the right-hand side of the front portion of the transmission case 96 are connected a motor housing 98 with a power motor M enclosed therein and a drive unit case 100 with a motor driver 99 enclosed therein.

The power motor M includes a transversely extending rotatable shaft 103 which is rotatably carried on both a ball bearing 101 supported by the transmission case 96 and a ball bearing 102 supported by the motor housing 98, a magnet rotor 104 is adapted to rotate integrally with the rotatable shaft 103, and a stator coil 105 fixed to the motor housing 98 opposedly to the outer periphery of the magnet rotor 104. A rotor position sensor 106 is provided at the rightmost end of the rotatable shaft 103.

A fan 107 which rotates integrally with the rotatable shaft 103 is mounted on a portion of the shaft 103 extending leftward from the power motor M. The motor driver 99 which controls the operation of the power motor M is formed generally in a ring shape and clamped to the motor housing 98 with bolts 108 together with the drive unit case 100.

Slits $100_1$ are formed in the right-hand side face of the drive unit case 100 for introducing the outside air into a cooling air passage 109 formed in a central cavity of the motor driver 99. The cooling air passage 109 and the interior of the motor housing 98 are in communication with each other through an air conducting hole $98_1$ formed in the motor housing. Further, an exhaust passage 110 is provided behind the fan 107 in the transmission case 96 which communicates with the interior of the motor housing 98 through an exhaust hole $96_1$ formed in the transmission case 96. Under the operation of the fan 107 which rotates together with the rotatable shaft 103 of the power motor M, the outside air introduced from the slits $100_1$ passes through the cooling air passage 109 and the air conducting hole $98_1$, then contacts the power motor M and is thereafter discharged to the exterior from the exhaust passage 110 through the exhaust hole $96_1$. The motor driver 98 and the power motor M are cooled by the thus-flowing outside air. The arrows shown in FIG. 16 indicate such flow of air.

The following is an explanation of a transmission mechanism for transmitting the rotation of the power motor M to the axles 68 and 69 of the rear wheels Wr at an appropriate torque matching a vehicular speed.

The transmission mechanism is provided with a belt type stepless transmission 112 of a known structure. The stepless transmission 112 includes a driving pulley 113 of a centrifugal type variable diameter structure mounted on the leftmost end of the rotatable shaft 103 of the power motor M, a missions input shaft 117 carried on both a ball bearing 114 provided in the transmission case 96 and a ball bearing 116 provided in a mission case 115 formed integrally on the right-hand side of the rear portion of the transmission case 96, a driven pulley 118 of a variable diameter structure mounted on the mission input shaft 117, a driving belt 119 of a V-belt structure entrained about both pulleys 113 and 118, and an automatic centrifugal clutch 120 disposed on the left side of the driven pulley 118 and capable of cutting off the transfer of driving force between the driven pulley 118 and the mission input shaft 117.

A counter shaft 121 is rotatably mounted within the interior of the mission case 115, and a reduction gear train 112 is disposed between the mission input shaft 117 and the counter shaft 121. The rotation of the counter shaft 121 is transmitted to a differential case 125 through a final drive gear 123 and a final driven gear 124, then further transmitted to left and right axles 68, 69.

The power unit P having the above construction is connected to the upper portion of the rear body bracket 5 using front and rear bolts 126, 127, and batteries B for driving the power motor M are accommodated in a battery box 129 formed integrally with a rear fender 128 which covers the upper portion of the power unit.

The rear fender 128 includes arcuate right and left fender portions $128_1$ which cover right and left rear wheels Wr, and a cover portion $128_2$ which connects both fender portions $128_1$ and covers the rear portion of the power unit P. The battery box 129 is integrally formed in front of the cover portion $128_2$, while in the rear of the cover portion $128_2$ a mounting portion is integrally formed for the control unit U, which is a charger box 130 in this embodiment. Further, a plurality of stays 131 are provided in the battery box 129, cover portion $128_2$ and fender portion $128_1$ are connected to the upper portion of the power unit P.

The battery box 129 comprises a battery box body 132 which is a box in the shape of rectangular parallelepiped and a lid 133 which is hinged to the front end of the battery box body 132 to open and close an upper opening of the body 132. In the interior of the battery box body 132 are accommodated two batteries B in a longitudinally arranged state. The batteries B are interconnected electrically and a cord 134 for supplying electric power to the power motor M is connected to the front-side battery B.

The charger box 130 comprises a charger box body 135 which is in the shape of rectangular parallelepiped having a rear opening, and a lid 136 which is hinged to the lower end of the opening of the charger box body 135. The lid 136 is retained by a hook 137 attached to the charger box body 135, and in this state the opening of the body 135 is closed. The inner space of the charger box body 135 is divided into front and rear portions by means of a partition plate $135_1$, and in the front portion is received a charger 138, while in the rear portion is accommodated a power cord 140 in a folded state. The power cord 140 is connected to the charger 138 and is provided at the front end thereof with a plug 139 which is connected to an AC power supply. By inserting the plug 139 into, for example, an AC power supply for domestic use, an electric current is fed from the charger 138 to each battery B through a cord 141. A guide 142 for the cord 141 is formed on the cover portion $128_2$ of the rear fender 128, and an insertion hole for the cord 141 is formed in the battery box 129.

The operation of the second embodiment having the above construction will be described below.

The operation for charging the batteries B goes through the steps of opening the lid 133 of the charger box 130, taking out the power cord 140, inserting the plug 139 into a house-service power source and allowing a predetermined charging time to elapse. When the charging is over, the power cord 140 is placed into the charge box 130 and the lid 133 is closed. Now the vehicle is ready for movement.

When the power motor M supplied with electric power from the batteries B is driven, the driving pulley 113 of the belt type stepless transmission 112 mounted on the rotatable shaft 103 rotates. This rotation is transmitted to the driven pulley 118 by means of the driving belt 119, and the rotation of the driven pulley 118 is transferred to the automatic centrifugal clutch 120. In the case where the rotational speed of the power motor M is very low, the clutch 120 is in a disengaged state, while upon engagement of the clutch 120 with an increase in the motor rotation, the rotation of the power motor M is transmitted to the mission input shaft 117 through the stepless transmission 112 and clutch 120, and is then further transmitted through the reduction gear train 122 and axles 68, 69 to the rear wheels Wr to drive the rear wheels.

As the rotational speed of the power motor M increases, an effective radius of the driving pulley 113 of the stepless transmission 112 increases and that of the driven pulley 118 decreases, so that the reduction ratio of the stepless transmission 112 changes automatically.

Since the charger 138 and the batteries B are both supported by the rear fender 128, the simplification of the support structures for them and the simplification of electric wire layout are both attained at the same time. Since the batteries B are heavy objects which are mounted in a low position of the rear portion of the vehicle body, not only it is possible to keep the centroid position of the vehicle body low and thereby improve the stability of the vehicle body but also it is possible to let the vehicle exhibit an excellent turning performance because the weight of the batteries B is not exerted on the front portion of the vehicle body.

Although embodiments of the present invention have been described above in detail, the present invention is not limited to those embodiments and various minor design modifications may be made.

For example, although three-wheeled motor vehicles are illustrated in the above embodiments, the present invention is also applicable to two- and four-wheeled motor vehicles. The mounting position of the fan 88 is not limited to the one shown in the embodiments. The fan 88 may be disposed in any appropriate position between the air inlet port and the air exhaust port. If necessary, a cooling fan 94 to be used exclusively for cooling the control unit U may be added, see FIG. 9. In this case, it is possible to make the construction in such a manner that the cooling fan 94 is supported by the battery box cover 80 and the exhaust air is discharged to the exterior directly without passing through the exhaust passage 92. Further, for preventing an excessive increase in the temperature of the batteries B, an air inlet port capable of being opened and closed may be formed in the battery box 77.

As set forth hereinabove, according to the first feature of the present invention, since the batteries and the control unit are disposed in an integral form near the motor, not only does it become possible to simplify the support structures for them and thereby ensure a sufficient cooling space around the motor, but also the maintainability of the motor and the components located thereabouts is improved.

According to the second feature of the present invention, since the batteries and the control unit are supported in a vibration-proof manner by the vehicle body frame, it is possible to terminate vibrations developed with vehicular running and prevent them from being transmitted to the batteries and control unit.

According to the third feature of the present invention, the batteries are waterproof and the control unit is improved because the batteries are accommodated in the interior of the battery box and the control unit is disposed within a constituent member of the battery box.

According to the fourth feature of the present invention, since at least the batteries and the charger for the batteries are made integral with each other, it is possible to omit the mounting and removing operation for wiring which connects the batteries and the charger. Besides, the maintainability of the motor and the components located thereabouts is improved.

According to the fifth feature of the present invention, since the batteries accommodated in the battery receptacle portion and the control unit accommodated in the control unit receptacle portion are connected with each other through a cord and this cord is provided with a connection means so as to permit access to the control unit receptacle portion upon removal of the cord from the batteries, it is possible to open the control unit receptacle portion in an electrically disconnected state between the control unit and the batteries, whereby the maintainability of the control unit is improved.

According to the sixth feature of the present invention, since a cooling fan is disposed in the interior of the battery receptacle portion, it is possible to easily ensure a mounting space for the cooling fan.

According to the seventh feature of the present invention, since a cooling fan is disposed in the interior of the control unit receptacle portion, it is possible to easily ensure a mounting space for the cooling fan.

According to the eighth feature of the present invention, since a wheel is suspended through a cushion from the vehicle body frame which supports the batteries and the batteries are distributed before and behind the cushion, it is possible to disperse the battery load equally before and behind the vehicle body frame with the cushion as the center. As a result, it is possible to prevent the battery load from being concentrated locally on a specific part of the vehicle body frame and thereby attain the reduction in weight of the vehicle body.

According to the ninth feature of the present invention, since the battery located in front of the motor is disposed in a position lower than that of the batteries located above the motor, it is possible to utilize the space around the motor effectively and thereby lower the centroid position of the batteries.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motor vehicle adapted to be powered by a drive motor driven by batteries, said motor vehicle comprising:

a vehicle body including a rear frame portion having parallel side members with inclined forward portions and generally horizontal rearward portions, said side members being interconnected at their rearward ends by a transverse member;

a battery box disposed between said side members and forwardly of said transverse member;

at least one battery;

a control unit including an electronic controller and a motor driver for said drive source and a shift motor;

said at least one battery disposed within said battery box, and said control unit disposed within a constituent member of said battery box, whereby said at least one battery and said control unit comprise an integrally formed assembly disposed in proximity to the drive source;

a plurality of hanger members projecting from said battery box;

a plurality of brackets disposed on said rear frame portion and depending therefrom, each of said plurality of hanger members corresponding to respective ones of said plurality of brackets; and a rubber damper disposed between each of said plurality of hanger members and said plurality of brackets for supporting said battery box in a vibration-proof manner relative to said vehicle body frame.

2. The motor vehicle according to claim 1, wherein said control unit further includes a charger for said at least one battery.

3. The motor vehicle according to claim 1, and further including a cord, said at least one battery accommodated in a battery receptacle portion of the battery box and the control unit accommodated in a control unit receptacle portion of the battery box disposed in close proximity to the battery receptacle portion are connected to each other through said cord, said cord having a connecting means so as to permit access to said control unit receptacle portion upon removal of the cord from the at least one battery.

4. The motor vehicle according to claim 1, and further including a cooling fan disposed in the interior of a battery receptacle portion of the battery box with the at least one battery accommodated therein.

5. The motor vehicle according to claim 1, and further including a cooling fan disposed in the interior of a control unit receptacle portion of the battery box with the control unit accommodated therein.

6. The motor vehicle according to claim 1, wherein there are a plurality of batteries arranged in front of and above the drive motor, and a battery located in front of the drive motor being in a lower position relative to a battery located above the drive motor.

* * * * *